(12) United States Patent
Bellert

(10) Patent No.: US 8,817,032 B2
(45) Date of Patent: Aug. 26, 2014

(54) SYSTEMS AND METHODS FOR FRAMEBUFFER MANAGEMENT

(75) Inventor: Darrell Eugene Bellert, Boulder, CO (US)

(73) Assignee: Konica Minolta Laboratory U.S.A., Inc., San Matco, CA (US)

( * ) Notice: Subject to any disclaimer, the term of this patent is extended or adjusted under 35 U.S.C. 154(b) by 523 days.

(21) Appl. No.: 12/201,735

(22) Filed: Aug. 29, 2008

(65) Prior Publication Data

US 2010/0053179 A1    Mar. 4, 2010

(51) Int. Cl.
*G06T 1/60* (2006.01)

(52) U.S. Cl.
USPC .......................... 345/530; 358/1.16; 358/1.17

(58) Field of Classification Search
USPC ................................. 345/530; 358/1.16–1.17
See application file for complete search history.

(56) References Cited

U.S. PATENT DOCUMENTS

| | | | |
|---|---|---|---|
| 4,782,398 A | 11/1988 | Mita | |
| 5,010,515 A | 4/1991 | Torborg et al. | |
| 5,041,920 A | 8/1991 | Hayes et al. | |
| 5,319,778 A | 6/1994 | Catino | |
| 5,471,579 A | 11/1995 | Kimura et al. | |
| 5,477,257 A | 12/1995 | Murata | |
| 5,479,587 A | 12/1995 | Campbell et al. | |
| 5,491,808 A | 2/1996 | Geist, Jr. | |
| 5,502,462 A | 3/1996 | Mical et al. | |
| 5,542,031 A | 7/1996 | Douglass et al. | |
| 5,577,243 A | 11/1996 | Sherwood et al. | |
| 5,646,670 A | 7/1997 | Seto et al. | |
| 5,739,842 A | 4/1998 | Murata | |
| 5,760,811 A | 6/1998 | Seto et al. | |
| 5,778,414 A | 7/1998 | Winter et al. | |
| 5,793,937 A | 8/1998 | Chura et al. | |
| 5,864,342 A | 1/1999 | Kajiya et al. | |
| 5,870,534 A | 2/1999 | Tsuchitoi | |
| 5,913,018 A | 6/1999 | Sela | |
| 5,946,334 A | 8/1999 | Ema et al. | |
| 5,959,867 A | 9/1999 | Speciner et al. | |

(Continued)

FOREIGN PATENT DOCUMENTS

| | | |
|---|---|---|
| JP | 2-275525 | 11/1990 |
| JP | 08-130618 A | 5/1996 |

(Continued)

OTHER PUBLICATIONS

Obrecht, Office Action dated Jul. 1, 2011, in U.S. Appl. No. 12/242,668, filed Sep. 30, 2008.

(Continued)

*Primary Examiner* — Kee M Tung
*Assistant Examiner* — Peter Hoang
(74) *Attorney, Agent, or Firm* — Osha Liang LLP

(57) ABSTRACT

Methods for managing a framebuffer in a single memory pool comprising frame buffer memory and display list memory on printing devices are presented. In some embodiments, a method for managing at least one pixmap corresponding to an image using equal sized blocks allocated to the pixmap from a memory pool comprises: receiving a request for at least one scanline in the image; securing a pointer to at least one block from the memory pool in response to the request for the at least one scanline, if memory blocks are available in the memory pool; and applying at least one of a plurality of memory freeing strategies, if there are no memory blocks available in the memory pool.

20 Claims, 7 Drawing Sheets

(56) References Cited

U.S. PATENT DOCUMENTS

| | | |
|---|---|---|
| 5,978,893 A | 11/1999 | Bakshi et al. |
| 5,999,709 A | 12/1999 | Fiala et al. |
| 6,031,995 A | 2/2000 | George |
| 6,040,917 A | 3/2000 | Campbell et al. |
| 6,057,847 A | 5/2000 | Jenkins |
| 6,092,171 A | 7/2000 | Relph |
| 6,111,582 A | 8/2000 | Jenkins |
| 6,192,157 B1 | 2/2001 | Prebble |
| 6,215,513 B1 | 4/2001 | Ashikaga |
| 6,249,793 B1 | 6/2001 | Printezis et al. |
| 6,252,675 B1 | 6/2001 | Jacobs |
| 6,326,964 B1 | 12/2001 | Snyder et al. |
| 6,366,289 B1* | 4/2002 | Johns ............................ 345/543 |
| 6,369,911 B1 | 4/2002 | Hattori |
| 6,472,946 B2 | 10/2002 | Takagi |
| 6,476,847 B2 | 11/2002 | Satoh et al. |
| 6,490,670 B1 | 12/2002 | Collins et al. |
| 6,498,617 B1 | 12/2002 | Ishida et al. |
| 6,603,116 B2 | 8/2003 | Niito |
| 6,643,759 B2 | 11/2003 | Andersson et al. |
| 6,701,420 B1 | 3/2004 | Hamilton et al. |
| 6,707,563 B1 | 3/2004 | Barry et al. |
| 6,731,317 B2 | 5/2004 | Ema et al. |
| 6,775,032 B2 | 8/2004 | Jacobs |
| 6,778,292 B1 | 8/2004 | Someno |
| 6,809,730 B2 | 10/2004 | Howson |
| 6,860,203 B2 | 3/2005 | Danilo et al. |
| 7,009,729 B2 | 3/2006 | Fujita |
| 7,031,025 B1 | 4/2006 | He et al. |
| 7,038,671 B2 | 5/2006 | Willis et al. |
| 7,064,859 B1 | 6/2006 | Dittrich et al. |
| 7,113,302 B2 | 9/2006 | Reddy et al. |
| 7,196,710 B1 | 3/2007 | Fouladi et al. |
| 7,428,075 B2 | 9/2008 | Johnston |
| 7,447,836 B2 | 11/2008 | Zhang et al. |
| 7,697,168 B2 | 4/2010 | Ozawa et al. |
| 7,715,031 B2 | 5/2010 | Westervelt et al. |
| 8,045,215 B2 | 10/2011 | Jacobsen et al. |
| 8,228,555 B2 | 7/2012 | Prebble |
| 8,526,049 B2 | 9/2013 | Guarnieri et al. |
| 2001/0015820 A1 | 8/2001 | Conrad et al. |
| 2001/0030769 A1 | 10/2001 | Jacobs |
| 2001/0030796 A1 | 10/2001 | Yao |
| 2001/0055129 A1 | 12/2001 | Shimizu |
| 2002/0063894 A1 | 5/2002 | Campbell et al. |
| 2002/0078298 A1 | 6/2002 | Jeddeloh |
| 2002/0093669 A1 | 7/2002 | Campbell et al. |
| 2002/0097433 A1 | 7/2002 | Chang et al. |
| 2002/0120826 A1 | 8/2002 | Venkatraman et al. |
| 2004/0044873 A1 | 3/2004 | Wong et al. |
| 2004/0098544 A1 | 5/2004 | Gaither et al. |
| 2004/0120007 A1 | 6/2004 | Jacobsen et al. |
| 2004/0156079 A1 | 8/2004 | Marshall et al. |
| 2004/0193775 A1 | 9/2004 | Van Doren et al. |
| 2004/0207861 A1 | 10/2004 | Hattori |
| 2004/0233207 A1 | 11/2004 | Morphet |
| 2005/0044549 A1 | 2/2005 | Morikawa et al. |
| 2005/0067498 A1 | 3/2005 | Smith |
| 2006/0001467 A1 | 1/2006 | Fujino et al. |
| 2006/0069898 A1 | 3/2006 | Patel et al. |
| 2006/0077193 A1 | 4/2006 | Thielemans et al. |
| 2006/0288187 A1 | 12/2006 | Burugula et al. |
| 2007/0146785 A1 | 6/2007 | Akiyama et al. |
| 2007/0153247 A1 | 7/2007 | Nagasaka |
| 2007/0229900 A1 | 10/2007 | Guarnieri et al. |
| 2007/0236733 A1* | 10/2007 | Guarnieri et al. ............ 358/1.16 |
| 2008/0002018 A1 | 1/2008 | Johnston |
| 2008/0002228 A1 | 1/2008 | Johnston |
| 2008/0002229 A1 | 1/2008 | Johnston |
| 2008/0007744 A1 | 1/2008 | Johnston |
| 2008/0007745 A1 | 1/2008 | Johnston |
| 2008/0162863 A1 | 7/2008 | McClure et al. |
| 2009/0086254 A1 | 4/2009 | Duong |
| 2009/0172336 A1 | 7/2009 | Schmidt |
| 2009/0244593 A1 | 10/2009 | Prebble |
| 2009/0249017 A1 | 10/2009 | Prebble |
| 2010/0060934 A1 | 3/2010 | Bellert |
| 2010/0079809 A1 | 4/2010 | Bellert |

FOREIGN PATENT DOCUMENTS

| | | |
|---|---|---|
| JP | 08-202611 A | 8/1996 |
| JP | 2000-141811 A | 5/2000 |
| JP | 2003-011440 A | 1/2003 |
| JP | 2004-038527 A | 2/2004 |
| JP | 2004-054933 | 2/2004 |
| JP | 2005-073004 | 3/2005 |
| JP | 2005-190487 | 7/2005 |
| JP | 2005-327255 | 11/2005 |
| JP | 2009-245437 | 10/2009 |

OTHER PUBLICATIONS

Guarnieri, Office Action dated Aug. 18, 2009, in U.S. Appl. No. 11/394,783, filed Mar. 31, 2006.

Guarnieri, Office Action dated Apr. 13, 2010, in U.S. Appl. No. 11/394,783, filed Mar. 31, 2006.

Guarnieri, Office Action dated Nov. 26, 2010, in U.S. Appl. No. 11/394,783, filed Mar. 31, 2006.

Guarnieri, Office Action dated May 23, 2011, in U.S. Appl. No. 11/394,783, filed Mar. 31, 2006.

Guarnieri, Office Action dated Mar. 21, 2011, in U.S. Appl. No. 11/515,337, filed Aug. 31, 2006.

Prebble, Office Action dated Oct. 7, 2010, in U.S. Appl. No. 12/059,627, filed Mar. 31, 2008.

Prebble, Office Action dated Apr. 6, 2011, in U.S. Appl. No. 12/059,692, filed Mar. 31, 2008.

Office Action dated Sep. 12, 2011, for U.S. Appl. No. 11/515,337.

Office Action dated Nov. 23, 2011, for U.S. Appl. No. 12/059,627.

Office Action dated Jan. 5, 2012, in U.S. Appl. No. 11/515,337, filed Aug. 31, 2006.

Office Action dated Sep. 7, 2012, in U.S. Appl. No. 11/515,337, filed Aug. 31, 2006.

Notice of Allowance dated Mar. 23, 2012, in U.S. Appl. No. 12/059,627, filed Mar. 31, 2008.

Office Action dated Dec. 15, 2011, in U.S. Appl. No. 12/209,046, filed Sep. 11, 2008.

Office Action dated Jun. 11, 2012, in U.S. Appl. No. 12/209,046, filed Sep. 11, 2008.

Office Action dated Feb. 9, 2012, in U.S. Appl. No. 12/242,668, filed Sep. 30, 2008.

Office Action dated Aug. 17, 2012, in U.S. Appl. No. 12/242,668, filed Sep. 30, 2008.

Notification of Refusal for JP patent application No. 2009-192942, mailed Jul. 16, 2013, with English translation.

Notification of Reasons for Refusal mailed by the Japanese Patent Office on Feb. 19, 2013, in Japanese patent application No. 2009-081519.

Final Office Action for U.S. Appl. No. 12/209,046 dated Sep. 27, 2013.

Final Office Action for U.S. Appl. No. 12/242,668 dated Nov. 27, 2013.

Notice of Abandonment for U.S. Appl. No. 11/515,337 dated Dec. 16, 2013.

Notice of Allowance for U.S. Appl. No. 11/394,783 dated Apr. 22, 2013.

Notification of Reasons for Refusal with English language translation for JP Patent Application No. 2009-222772 dated Jun. 18, 2013.

Notification of Refusal with English language translation for JP Patent Application No. 2009-206817 dated Dec. 10, 2013.

Non-final Office Action for U.S. Appl. No. 12/242,668 dated Jun. 14, 2013.

Notification of Refusal in JP Patent Application No. 2009-192942, and English translation, dated Oct. 29, 2013.

Office Action dated Jan. 16, 2013, in U.S. Appl. No. 11/394,783, filed Mar. 31, 2006.

(56) References Cited

OTHER PUBLICATIONS

Notice of Allowance dated Apr. 22, 2013, in U.S. Appl. No. 11/394,783, filed Mar. 31, 2006.
Office Action dated Jun. 10, 2013, in U.S. Appl. No. 11/515,337, filed Aug. 31, 2006.
Office Action dated Dec. 11, 2012, in U.S. Appl. No. 12/059,692, filed Mar. 31, 2008.
Office Action dated May 15, 2013, in U.S. Appl. No. 12/059,692, filed Mar. 31, 2008.
Office Action dated Nov. 8, 2013, in U.S. Appl. No. 12/059,692, filed Mar. 31, 2008.
Office Action dated Apr. 19, 2013, in U.S. Appl. No. 12/209,046, filed Sep. 11, 2008.
Office Action dated Dec. 10, 2012, in U.S. Appl. No. 12/242,668, filed Sep. 30, 2008.

* cited by examiner

SYSTEMS AND METHODS FOR FRAMEBUFFER MANAGEMENT

BACKGROUND

1. Technical Field

The present disclosure pertains to the field of printing and in particular, to systems and methods for framebuffer management.

2. Description of Related Art

Document processing software allows users to view, edit, process, store, and print documents conveniently. However, before a document can be printed, pages in the document are often described in a page description language ("PDL"). As used in this document PDL's include languages used to describe pages in a document such as PostScript, Adobe PDF, HP PCL, Microsoft XPS, and variants thereof. PDL descriptions provide a high-level portrayal of each page in a document and are often translated to a series of lower-level printer-specific commands when the document is being printed—a process termed rasterization. Although the rasterization process may be complex and depend on the features and capabilities offered by a particular printer, flexible and portable general-purpose rasterization schemes may allow printer performance optimizations based on available memory, desired print speed, cost, and other criteria.

Traditionally, memory in printing systems has been organized in two distinct pools comprising display list memory and frame buffer memory. Display list memory typically holds display list objects for rasterization, while the frame buffer memory typically holds image data specifying marks to be made on a printed page. A bitmap is a type of memory organization used to store digital images, in which each pixel is assigned a single bit (i.e. the pixel is either "on" or "off"). The term pixmap (or pixel map) is used to denote a raster image that can exist at a number of bit depths. Because of the separate nature of the two pools, display list memory cannot typically be used for frame buffer purposes, and vice versa. Therefore, print failures can occur due to insufficient memory in one pool even if there is sufficient available memory in the other pool. Moreover, the use of separate routines to manage the two distinct pools may make it difficult to modify and maintain the code used to manage memory across a product family because different strategies and optimizations may be used in individual products.

Memory resource optimizations may be important even in situations where the entire memory is treated as a single pool. For example, pixmaps in frame buffers have traditionally used variable-sized contiguous chunks of memory, which leads to memory fragmentation. Fragmentation causes available memory to be scattered in small unusable blocks preventing satisfaction of some memory allocation requests, even though the aggregate of the available memory in the small blocks could have satisfied the memory request if the small blocks were contiguous.

Where the memory is shared between the display list and frame buffer, memory optimizations become important in ensuring that each pool has adequate available memory during printer operation and that potentially available memory is not lost due to inefficiencies in allocation. At a global level, the optimization strategies may ensure that memory is allocated between display list and framebuffer memory to meet printer design goals such as cost and/or print speed. In addition, localized display list and framebuffer specific optimizations ensure that optimizations available at a lower level are exploited. In inexpensive printers, efficient memory resource may allow design functionality to be achieved using relatively lower memory. In high-end printers, efficient use of memory may allow for greater real-time availability of memory for printing applications and lead to performance improvements.

Thus, there is a need for systems and methods to manage memory on printers for rasterization, including framebuffer memory that would allow an optimal use of memory resources, while providing a seamless upgrade path.

SUMMARY

Consistent with disclosed embodiments, systems and methods for managing a frame buffer memory are presented. In some embodiments, a method for managing at least one pixmap corresponding to an image using equal sized blocks allocated to the pixmap from a memory pool comprises: receiving a request for at least one scanline in the image; securing a pointer to at least one block from the memory pool in response to the request for the at least one scanline, if memory blocks are available in the memory pool; and applying at least one of a plurality of memory freeing strategies, if there are no memory blocks available in the memory pool. The memory pool may comprise frame buffer memory and display list memory.

Embodiments disclosed also relate to methods created, stored, accessed, or modified by processors using computer-readable media or computer-readable memory.

These and other embodiments are further explained below with respect to the following figures.

DETAILED DESCRIPTION

In accordance with embodiments reflecting various features of disclosed embodiments, systems and methods for the automatic storing, manipulating, and processing of a second or intermediate form of printable data generated from a first printable data are presented. In some embodiments, the first printable data may take the form of a PDL description of a document and the intermediate printable data may take the form of a display list of objects generated from the PDL description.

Figure 1:
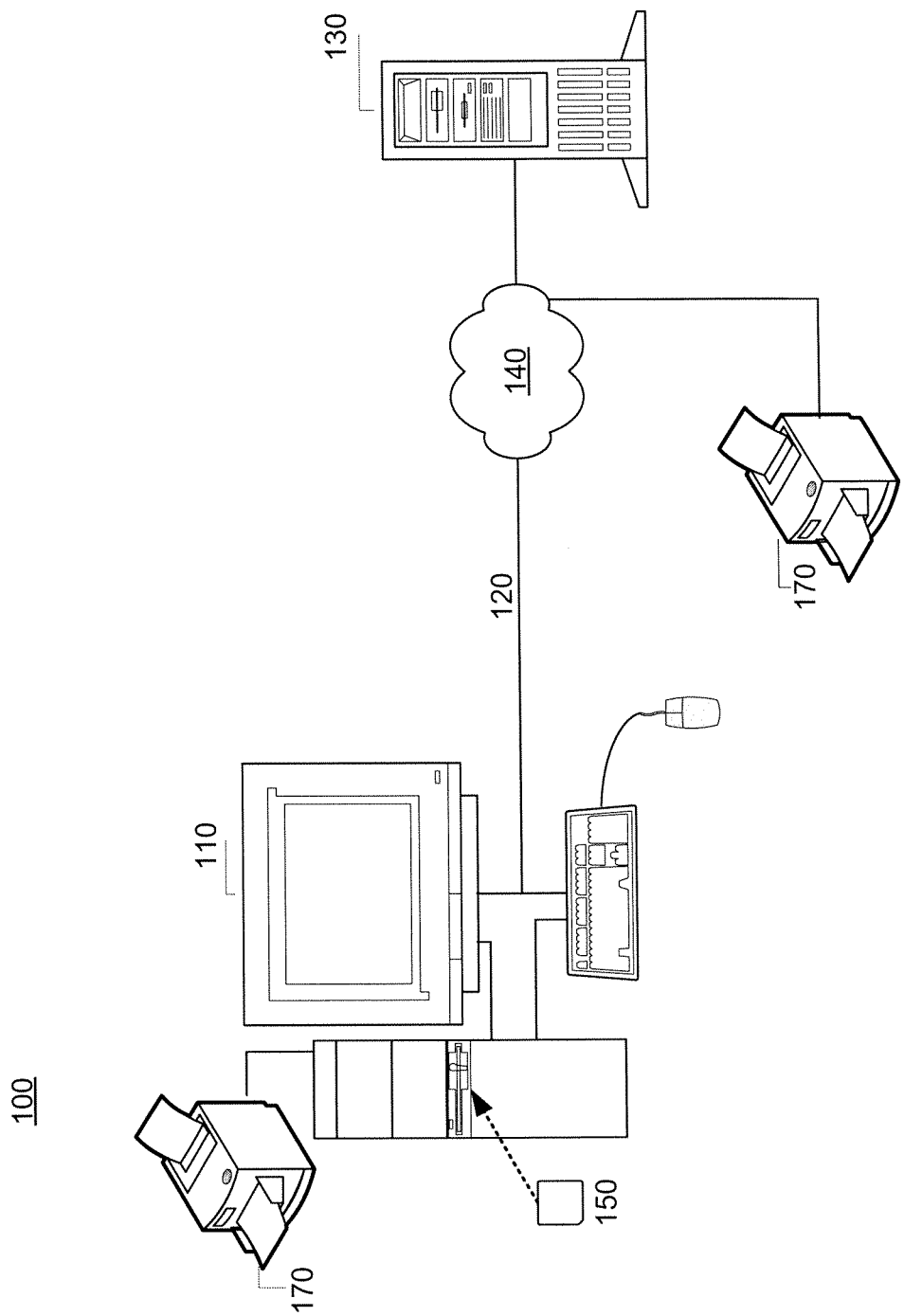
FIG. 1 shows a block diagram illustrating components in a system for printing documents.

FIG. 1 shows a block diagram illustrating components in a system for printing documents. A computer software application consistent with disclosed embodiments may be deployed on a network of computers, as shown in FIG. 1, that are connected through communication links that allow information to be exchanged using conventional communication protocols and/or data port interfaces.

As shown in FIG. 1, exemplary system 100 includes computers including a computing device 110 and a server 130.

Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Exemplary printer 170 includes devices that produce physical documents from electronic data including, but not limited to, laser printers, inkjet printers, LED printers, plotters, facsimile machines, and digital copiers. In some embodiments, printer 170 may also be capable of directly printing documents received from computing device 110 or server 130 over connection 120. In some embodiments such an arrangement may allow for the direct printing of documents, with (or without) additional processing by computing device 110 or server 130. In some embodiments, documents may contain one or more of text, graphics, and images. In some embodiments, printer 170 may receive PDL descriptions of documents for printing. Note, too, that document print processing can be distributed. Thus, computing device 110, server 130, and/or the printer may perform portions of document print processing such as half-toning, color matching, and/or other manipulation processes before a document is physically printed by printer 170.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/or any other removable media drives consistent with disclosed embodiments. In some embodiments, portions of the software application may reside on removable media and be read and executed by computing device 110 using removable media drive 150.

Connection 120 couples computing device 110, server 130, and printer 170 and may be implemented as a wired or wireless connection using conventional communication protocols and/or data port interfaces. In general, connections 120 can be any communication channel that allows transmission of data between the devices. In one embodiment, for example, the devices may be provided with conventional data ports, such as parallel ports, serial ports, Ethernet, USB, SCSI, FIREWIRE, and/or coaxial cable ports for transmission of data through the appropriate connection. In some embodiments, connection 120 may be a Digital Subscriber Line (DSL), an Asymmetric Digital Subscriber Line (ADSL), or a cable connection. The communication links could be wireless links or wired links or any combination consistent with disclosed embodiments that allows communication between the various devices.

Network 140 could include a Local Area Network (LAN), a Wide Area Network (WAN), or the Internet. In some embodiments, information sent over network 140 may be encrypted to ensure the security of the data being transmitted. Printer 170 may be connected to network 140 through connection 120. In some embodiments, printer 170 may also be connected directly to computing device 110 and/or server 130. System 100 may also include other peripheral devices (not shown), according to some embodiments. A computer software application consistent with the disclosed embodiments may be deployed on any of the exemplary computers, as shown in FIG. 1. For example, computing device 110 could execute software that may be downloaded directly from server 130. Portions of the application may also be executed by printer 170 in accordance with disclosed embodiments.

Figure 2:
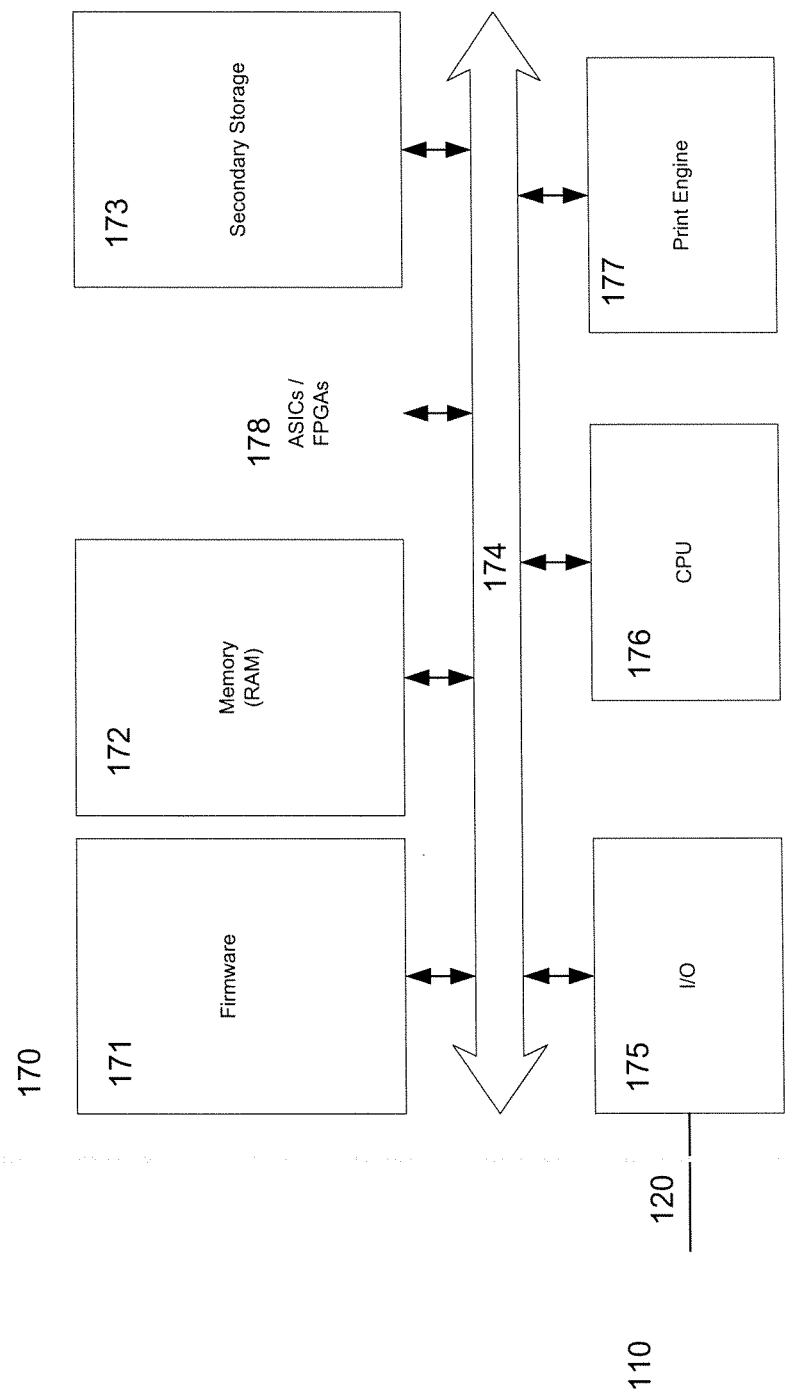
FIG. 2 shows a high level block diagram of an exemplary printer.

FIG. 2 shows a high-level block diagram of exemplary printer 170. In some embodiments, printer 170 may contain bus 174 that couples CPU 176, firmware 171, memory 172, input-output ports 175, print engine 177, and secondary storage device 173. Printer 170 may also contain other Application Specific Integrated Circuits (ASICs), and/or Field Programmable Gate Arrays (FPGAs) 178 that are capable of executing portions of an application to print documents according to disclosed embodiments. In some embodiments, printer 170 may also be able to access secondary storage or other memory in computing device 110 using I/O ports 175 and connection 120. In some embodiments, printer 170 may also be capable of executing software including a printer operating system and other appropriate application software. In some embodiments, printer 170 may allow paper sizes, output trays, color selections, and print resolution, among other options, to be user-configurable.

In some embodiments, CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as, but not limited to, SDRAM, or RDRAM. Firmware 171 may hold instructions and data including but not limited to a boot-up sequence, pre-defined routines, memory management routines, and other code. In some embodiments, code and data in firmware 171 may be copied to memory 172 prior to being acted upon by CPU 176. Routines in firmware 171 may include code to translate page descriptions received from computing device 110 to display lists and image bands. In some embodiments, firmware 171 may include routines to rasterize display lists to an appropriate pixmap and store the pixmap in memory 172. Firmware 171 may also include compression routines and memory management routines. In some embodiments, data and instructions in firmware 171 may be upgradeable.

In some embodiments, CPU 176 may act upon instructions and data and provide control and data to ASICs/FPGAs 178 and print engine 177 to generate printed documents. In some embodiments, ASICs/FPGAs 178 may also provide control and data to print engine 177. FPGAs/ASICs 178 may also implement one or more of translation, compression, and rasterization algorithms. In some embodiments, computing device 110 can transform document data into a first printable data. Then, the first printable data can be sent to printer 170 for transformation into intermediate printable data. Printer 170 may transform intermediate printable data into a final form of printable data and print according to this final form, which may take the form of a pixmap. In some embodiments, the first printable data may correspond to a PDL description of a document. In some embodiments, the translation process from a PDL description of a document to the final printable data comprising of a series of lower-level printer-specific commands may include the generation of intermediate printable data comprising of display lists of objects.

In some embodiments, display lists may hold one or more of text, graphics, and image data objects. In some embodiments, objects in display lists may correspond to similar objects in a user document. In some embodiments, display lists may aid in the generation of intermediate or final printable data. In some embodiments, display lists and/or pixmaps may be stored in memory 172 or secondary storage 173. Exemplary secondary storage 173 may be an internal or external hard disk, memory stick, or any other memory storage device capable of being used in printer 170. In some embodiments, the display list may reside on one or more of printer 170, computing device 110, and server 130. Memory to store display lists and/or pixmaps may include dedicated memory or may form part of general purpose memory, or some combination thereof according to some embodiments. In some embodiments, memory may be dynamically allocated to hold display lists and/or pixmaps as needed. In some embodiments, memory allocated to store display lists and/or pixmaps may be dynamically released after processing.

Figure 3:
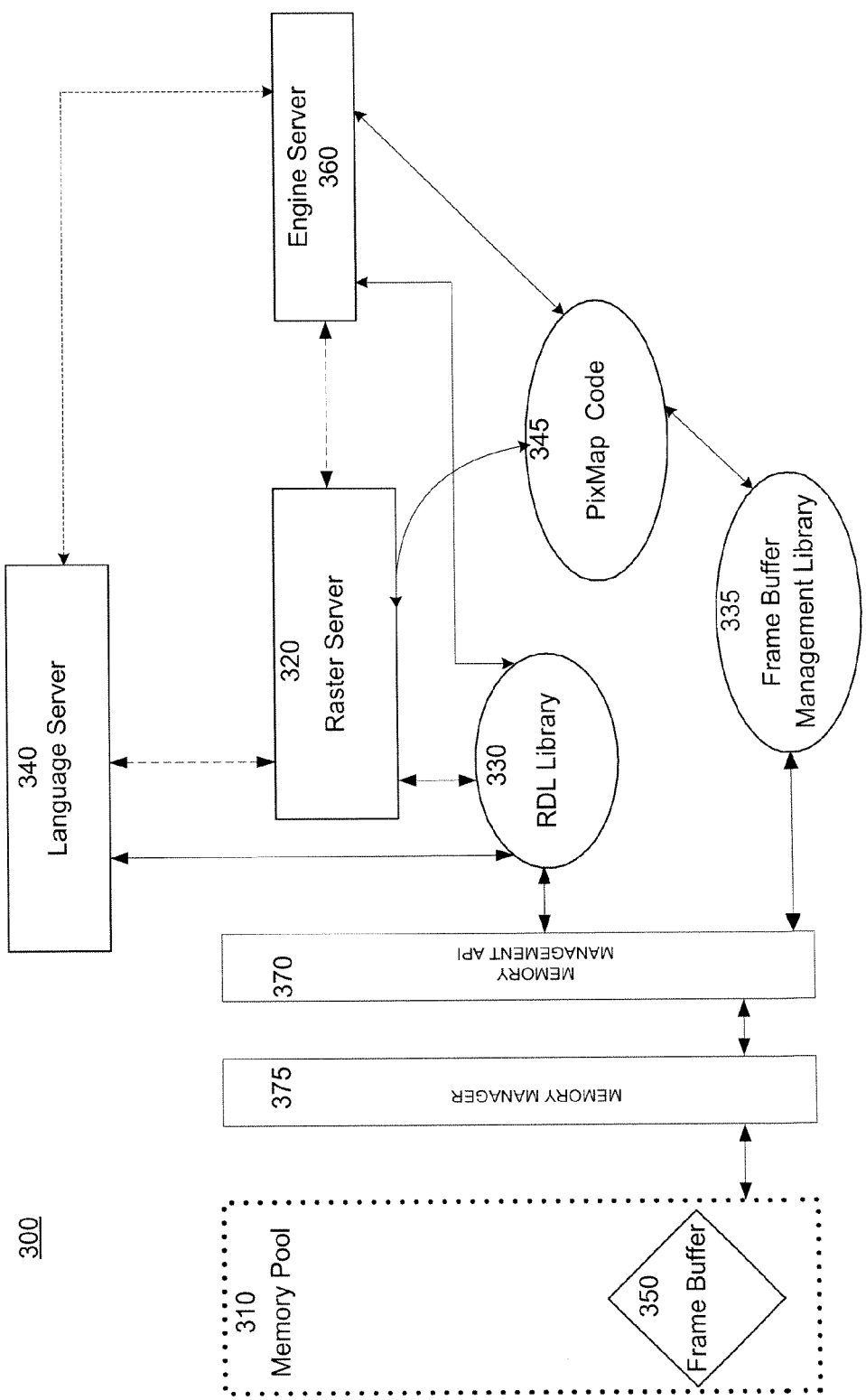
FIG. 3 shows an exemplary high-level architecture of a system for framebuffer management.

FIG. 3 shows an exemplary high-level architecture 300 of a system for framebuffer management. In accordance with disclosed embodiments, architecture 300 permits memory pool 310 to be managed as a single memory pool comprising blocks corresponding to both frame buffer 350 and non-frame buffer blocks. On one hand, memory manager 375 allows memory allocation in blocks to prevent fragmentation, abstracts away implementation details pertaining to memory management, and provides a standard interface through memory management Application Programming Interface ("API") 370 for access to its routines. On the other hand, pixmap code 345 allows pixmaps to be viewed logically as an integral unit while permitting pixmaps to occupy discontiguous memory blocks in memory pool 310 by leveraging the functionality provided by memory manager 375 through memory management API 370 and frame buffer management library 335.

As shown in FIG. 3, language server 340, engine server 360, and raster server 320 may communicate with each other. In addition, language server 340, engine server 360, and raster server 320 may invoke routines and communicate with RDL library 330. The system may also include frame buffer management library 335, which communicates with pixmap code 345; and with raster server 320 and engine server 360 through memory management API 370.

Memory manager 375 allocates and manages memory. Routines in memory manager 375 may be accessed using memory management API 370. Thus, details of memory management code can be abstracted away from program code used to manage and/or manipulate the display list or frame buffer. Similarly, in some embodiments, pixmap code 345 may allow the use and manipulation of pixmaps as a single logical entity, while permitting pixmaps to extend over one or more discontiguous memory blocks. This abstraction can be achieved using frame buffer management library 335 to manage: block and pointer allocation and deallocation for pixmaps; state information pertaining to pixmaps; and to track processes utilizing pixmaps. In some embodiments, pixmap code 345 may enable access to memory blocks for pixmaps. Each memory block is a chunk of contiguous memory. Memory blocks may contain one or more scanlines. A scanline is one row of pixels in the image.

In some embodiments, frame buffer management library 335 may allocate memory in blocks. In one embodiment, the blocks may be of equal size. In another embodiment, memory may be allocated either as a block, or as an integral multiple of blocks called a super-block. A super-block is a set of contiguous blocks. For example, frame buffer management library 335 may allocate memory in blocks and super-blocks, where a super-block may comprise four blocks. Super-blocks may be useful to hold larger pixmaps, and also facilitate support for different paper sizes, resolutions, and orientations.

In some embodiments, use of functionality provided by memory manager 375 may occur through a memory management application API 370. For example, frame buffer management library 335 may use memory manager 375 to obtain blocks and pointers, using interfaces specified in the memory management API 370. Memory manager 375 defines the functions of the memory management API 370. In some embodiments, code pertaining to display lists and the frame buffer 350, such as code in frame buffer management library 335, interface with memory manager 375 through memory management API 370. Accordingly, in these embodiments, the memory manager can be replaced or easily modified by a product-specific memory manager without changing program code used to manage and/or manipulate the display list or frame buffer.

In some embodiments, the display list may include commands defining data objects and their contexts within a document or a page within the document to be printed. These display commands may include data comprising characters or text, line drawings or vectors, and images or raster data.

In some embodiments, the display list may be dynamically reconfigurable and is termed a Reconfigurable Display List ("RDL"). In one embodiment, an RDL may be implemented using a data structure that allows certain display list objects to be stored in a manner that allows their manipulation dynamically. For example, image objects may be compressed in place to increase the amount of available memory, and decompressed when referenced and/or used. In some embodiments, an RDL may also permit RDL objects to be stored in memory and/or secondary storage by holding pointers, offsets, or addresses to the actual locations of RDL objects, which can then be retrieved when referenced and/or used. In general, the RDL allows display list objects to be flexibly stored and manipulated based on system constraints and parameters.

In one embodiment, the translation of a PDL description of a document into a display list and/or RDL representation may be performed by language server 340 using routines in RDL library 330 and memory manager 375. For example, language server 340 may take PDL language primitives and transform these into data and graphical objects and add these to the reconfigurable display list using the capability provided by functions in RDL library 330 and memory manager 375. In one embodiment, the display list may be stored and manipulated in a dynamically allocated memory pool such as exemplary memory pool 310, which may be part of memory 172.

In some embodiments, creation of the RDL may be an intermediate step in the processing of data prior to actual printing. The RDL may be parsed before conversion into a subsequent form. In some embodiments the subsequent form may be a final representation, and the conversion process may be referred to as rasterizing the data. For example, rasterization may be performed by raster server 320 using routines in frame buffer management library 335 and pixmap code 345. Upon rasterization, the rasterized data may be stored in frame buffer 350, which may be part of memory pool 310, using routines in memory manager 375, which may be accessed through memory management API 370. In one embodiment, the rasterized data may take the form of a bitmap or pixmap that specifies the marks to be made on a printed page.

In one embodiment, routines in memory manager 375 may manage some subset of available memory in memory 172 as memory pool 310 and allocate memory from memory pool 310 to requesting processes through memory management API 370. When memory is no longer needed by the requesting processes, the memory may be de-allocated and returned to memory pool 310, where it can be made available to other processes. Thus, exemplary memory manager 370 may also provide various other memory management functions, including routines to free memory, routines to recover memory, and swapping routines that can swap memory to secondary storage 173.

In some embodiments, frame buffer 350 may also be a part of memory pool 310 and may be managed by memory manager 375. For example, calls to functions in frame buffer management library 335, may result in calls to functions in memory management API 370. Memory management API may then invoke one or more functions in memory manager 375. Results of the actions taken by memory manager 375 may be routed back to the calling process. In one embodiment, frame buffer 350 may be allocated an initial contiguous block of memory and subsequent memory blocks may be allocated to frame buffer 350 when requested. Memory blocks may also be allocated for other non frame-buffer purposes from memory pool 310. In some embodiments, distinct memory blocks assigned to the frame buffer 350 or to other processes may occupy non-contiguous memory locations in memory 172.

Print engine 177, may process the rasterized data in frame buffer 350, and form a printable image of the page on a print medium, such as paper using routines in frame buffer library 335. In some embodiments, raster server 320 and engine server 360 may also use routines in RDL library 330 and pixmap code 345 to perform their functions. For example, routines in pixmap code 345 may provide raster server 320 with access to pixmap routines to support rasterization. In one embodiment, routines in pixmap code 345 may permit a final pixmap comprising one or more color plane components, and an alpha plane component to be utilized by print engine 177 through engine server 360.

In some embodiments, engine server 360 may provide control information, instructions, and data to print engine 177. In some embodiments, engine server 360 may invoke routines that lead to freeing memory used by framebuffer objects after processing for return to memory pool 320, using functionality provided by memory manager 375, through pixmap code 345, frame buffer library 335, and memory management API 370. Routines in pixmap code 345 may provide engine server 360 with access to scanlines for a pixmap. In some embodiments, portions of memory pool 310 and/or frame buffer 350 may reside in memory 172 or secondary storage 173.

In some embodiments, routines for language server 340, raster server 320, and engine server 360 may be provided in firmware 171 or may be implemented using ASICs/FPGAs 178.

Figure 4:
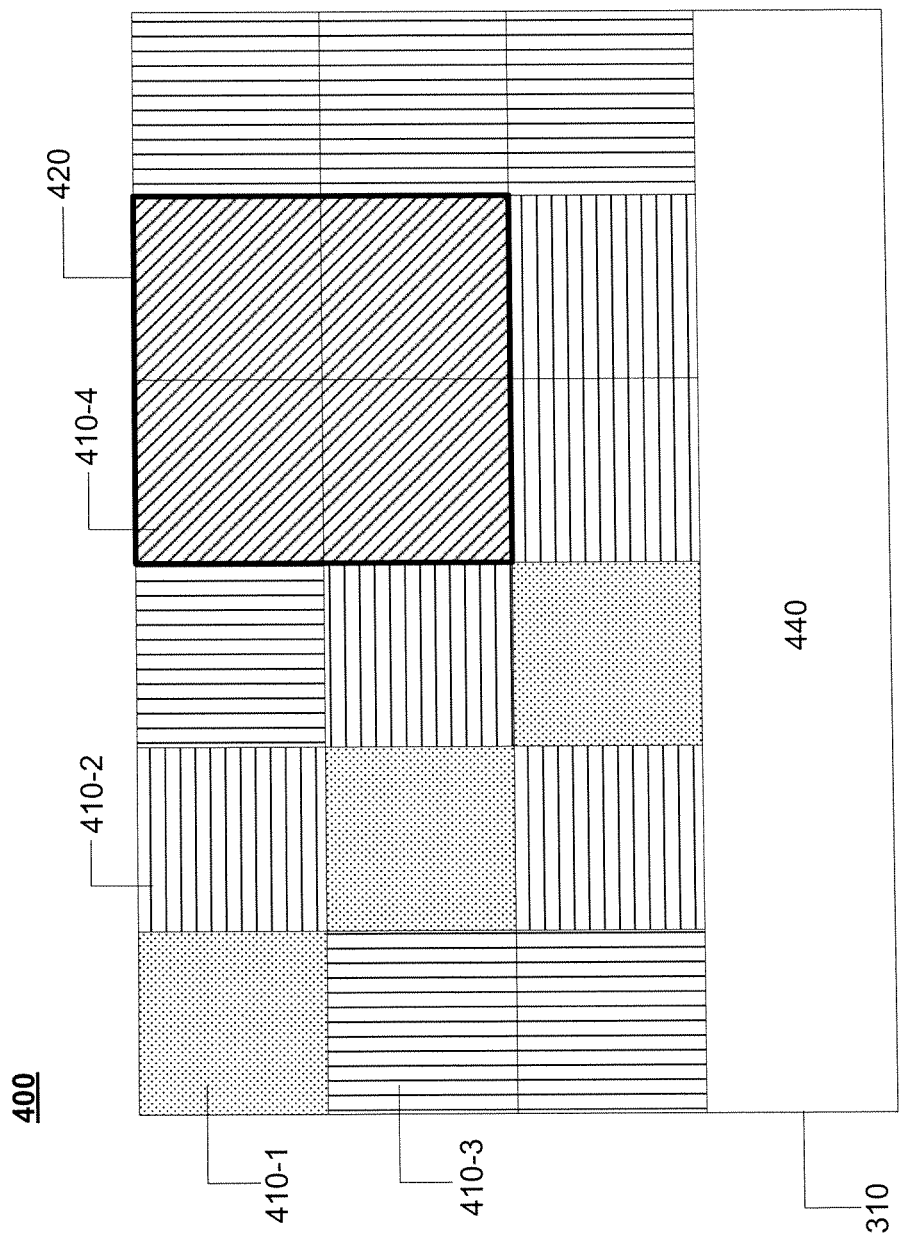
FIG. 4 shows a snapshot 400 illustrating an exemplary allocation of a portion of memory pool 310 during rasterization.

FIG. 4 shows a snapshot 400 illustrating an exemplary allocation of a portion of memory pool 310 during rasterization. At various points during rasterization, memory pool 310 may comprise of some combination of blocks 410, super-blocks 420, and unallocated memory 440. From a logical perspective, memory pool 310 may be viewed initially as unallocated memory 440, or a collection of free blocks 410. As shown in FIG. 4, memory comprises blocks 410-1, 410-2, 410-3, and 410-4, which may correspond to four distinct pixmaps A, B, C, and D, respectively.

When memory is requested for use by frame buffer 350, such as for storing a pixmap, a block 410 or super-block 420 may be allocated. When memory is requested for an RDL, or for temporary storage and processing purposes, a block 410 may be allocated. As shown in FIG. 4, pixmaps A, B, and C are dispersed among discontiguous memory blocks 410 scattered throughout memory 172. In some embodiments, memory defragmentation routines may be employed periodically, or when available memory is below some threshold, or as a strategy to free memory, in order to create new super-blocks 420 from disparate scattered blocks 410 in memory pool 310. For example, objects in memory may be rearranged and disparate scattered blocks combined to create larger contiguous memory sections.

In some embodiments, defragmentation may also be eliminated through the use of super-blocks. Accordingly, a super-block can be allocated when a block is requested. Because only a single block has been requested, one or more blocks in the super-block may be unused. When additional blocks are requested, then any unused blocks from the previously allocated super-block can be provided to the requester until none remain, at which time another super-block can allocated. For example, as shown in FIG. 4, pixmap D is contained within super-block 420.

In some embodiments, the breaking up of framebuffer 350 into discontiguous blocks 410 permits the efficient use of memory. For example, when a single scanline is accessed, blocks in the pixmap that do not contain the scanline of interest can be subjected to memory conservation or recovery schemes to increase the amount of available memory. For example, memory blocks may be swapped to disk, or compressed, to increase the availability of memory.

Figure 5:
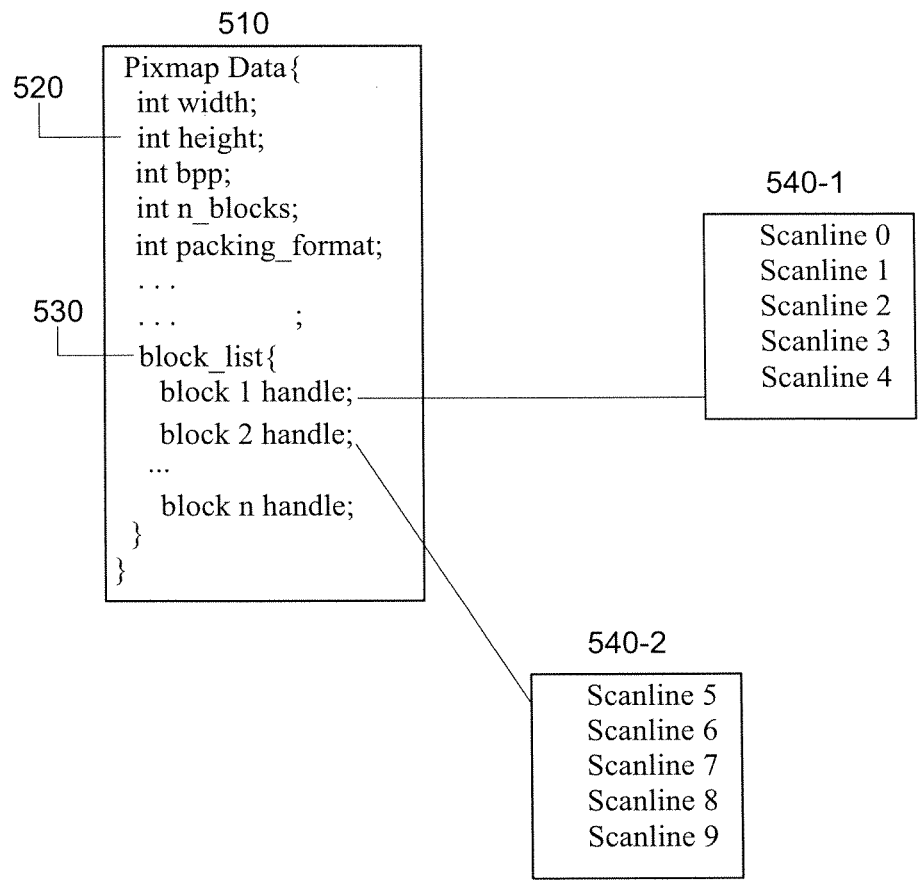
FIG. 5 shows a block diagram 500 illustrating an exemplary data structure for a pixmap object 510.

FIG. 5 shows a block diagram 500 illustrating some portions of an exemplary data structure for a pixmap object 510. Pixmap object 510 may be used and operated upon by routines in pixmap code 345. In some embodiments, pixmap object 510 may be characterized by internal information 520 pertaining to pixmap object 510, such as the width and height of the underlying image in pixels and by the number of bits per pixel or color depth. The color depth determines the number of colors that each pixel can represent. Internal information 520 may also include fields that store other information about the pixmap such as number of component planes, size in bits of each component, the packing format used to pack pixmap elements etc.

Pixmap object 510 may also include block list 530, which can hold information pertaining to blocks 410 or super blocks 420, corresponding to a given pixmap. Exemplary block list 530 may comprise one or more block handles, shown as block_handle_1 through block_handle_n. In some embodiments, each block handle may provide access to one or more scanlines in block 410 or super block 420. Block list 530 may also include data fields that hold pointers to blocks in the list. For example, a data structure associated with each block may hold pointers to the immediately succeeding and/or preceding block. In some embodiments, block list 530 may also be implemented as a dynamic array, which can be resized and also allows elements to be added or removed.

In some embodiments, the number of scanlines held by block 410 or super block 420 may be determined by the size of the allocated unit and other system parameters. For example, each block 410 corresponding to a pixmap may comprise N scanlines. However, the last block 410 for the pixmap may hold less than N scanlines. As shown in FIG. 5, each block 410 holds five scanlines. In some embodiments, a scanline may be divided further into components, including one or more of component planes, an alpha component, etc. For example, a pixel for a color image may comprise Cyan, Magenta, Yellow, and Black ("CMYK") components.

Figure 6:
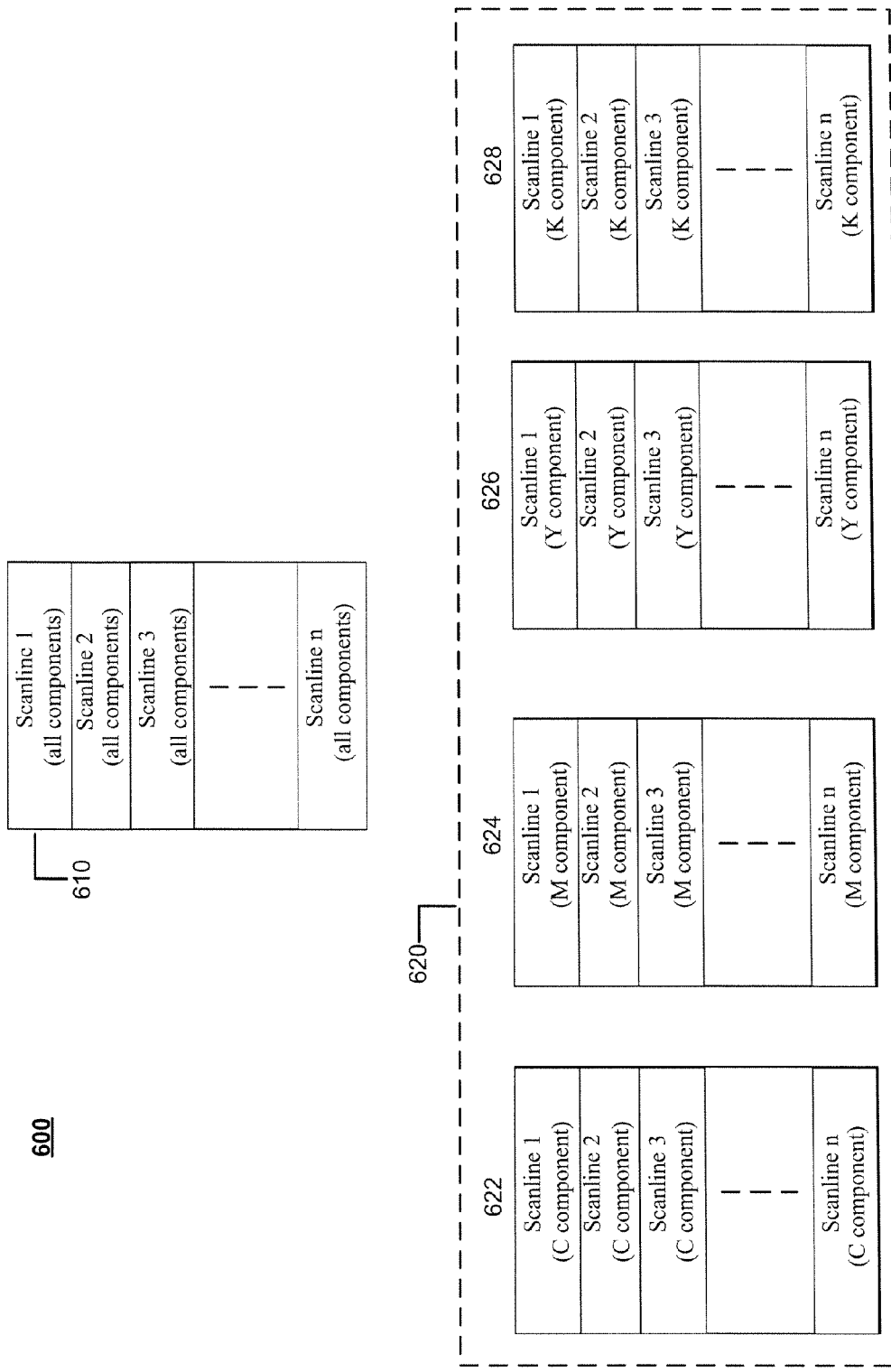
FIG. 6 shows a block diagram 600 of two alternative organizations for scanline components.

FIG. 6 shows a block diagram 600 of two alternative organizations for scanline components. In some embodiments, component planes for a pixmap may be packed together and component scanlines for pixmap blocks 410 may be interleaved. An interleaved organization 610 for scanline components is shown in FIG. 6. When print engines operate in tandem, a transfer belt (or photosensitive drum) may sequentially accumulate images from each component plane, and the composite image is then transferred to the print medium in a single pass. Accordingly, in printers 170 with tandem print engines an interleaved scanline organization 610 may be beneficial. When component scanlines are interleaved each component scanline may be output sequentially to the transfer belt (or photosensitive drum) before the print engine proceeds to the next scanline.

In some embodiments, scanlines for a pixmap may be packed together and component planes for pixmap blocks 410 may be interleaved. An interleaved component plane organization 620 is shown in FIG. 6. For a printer with a four cycle print engine, the print medium makes four passes across the transfer belt (or photosensitive drum). During each pass a component image is transferred and a composite image is obtained after four passes. Accordingly, in printers 170 with four-cycle print engines an interleaved color plane organization 620 may be beneficial. In the interleaved color plane organization 620, all scanlines for a color component are packed together. For example, C color component 622 holds all Cyan scanlines. Similarly, M color component 624, Y color component 626, and K color component 628, hold all Magenta, Yellow, and Black scanlines, respectively. When component planes are interleaved, scanlines for each component plane may be output sequentially to the transfer belt (or photosensitive drum) before the print engine proceeds to scanlines for the next color plane. In some embodiments, the engines may be offset with respect to each other so that the cycle time can be shortened considerably.

Figure 7:
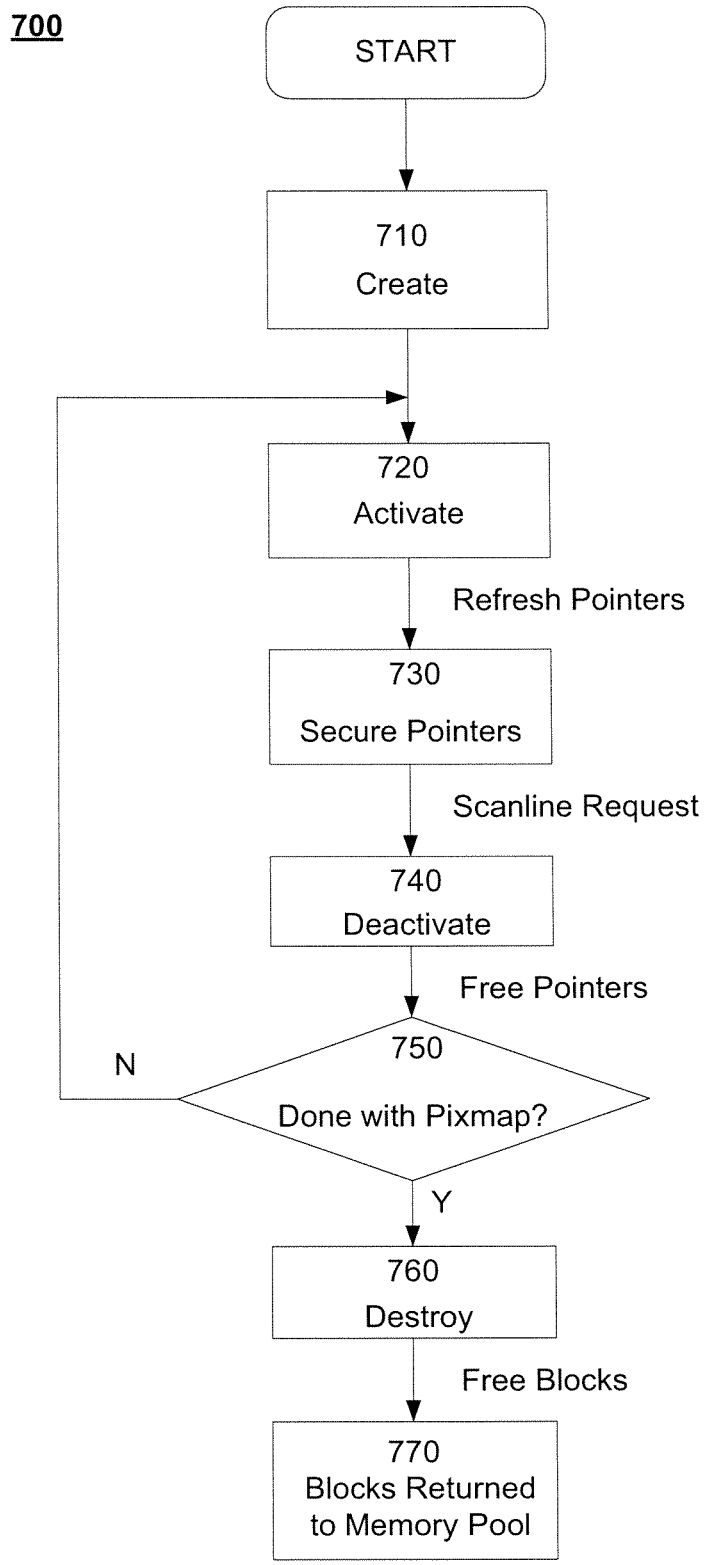
FIG. 7 shows a block diagram of an exemplary process flow 700 for the creation of an individual pixmap.

FIG. 7 shows a block diagram of an exemplary process flow 700 for the creation of an individual pixmap. In some embodiments, a pixmap may be created in step 710. When a pixmap is created, blocks for the pixmap may be allocated. In one embodiment, all blocks for the pixmap may be allocated but the blocks may not be physically present in main memory 172 at the time of allocation.

In step 720, the pixmap object 510 may be activated. When pixmap object 510 is activated by a process, pixmap object 510 is marked as being used by that process and internal pointers may be refreshed appropriately. Thus, an association exists between pixmap object 510 and a process following the activation step. Maintaining an association between pixmap object 510 and a process can be useful in the implementation of memory recovery schemes. For example, any memory recovery strategies that are invoked when a process is unable to obtain additional framebuffer memory may be applied to pixmap objects 510 associated with that process.

In some embodiments, in step 730, upon receiving the first request for a scanline for pixmap object 510, a pointer to block 410 or super-block 420 may be obtained. For example, when a scanline for pixmap object 510 is requested, and a pointer to the block 410 is not yet available, then a pointer to the block 410 can be obtained. The successful obtaining of a pointer to block 410 guarantees that block 410 is physically present in memory 172.

In step 740, pixmap object 510 may be deactivated. For example, pixmap object 510 may be deactivated when a process has completed operations involving pixmap object 510. Deactivation frees pointers associated with blocks 410 or super-blocks 420. After deactivation, blocks 410 or super-blocks 420 comprising pixmap object 510 may be swapped to secondary storage 173. In some embodiments, pointers to blocks 410 or super blocks 420 may persist until pixmap object 510 is deactivated.

In some embodiments, when a requesting process is unable to obtain additional framebuffer memory, or a pointer to a block, memory recovery strategies may be invoked. Memory recovery strategies may include waiting for other processes to release memory. If the wait times out, then additional memory recovery strategies may be invoked. For example, pointers to unused blocks in any pixmap objects 510 activated by the requesting process may be freed. Freeing the pointer allows memory manager 375 to swap out these blocks to secondary storage 173, thereby freeing memory for the requesting process.

In step 750, it may be determined if pixmap object 510 will be used subsequently in additional operations. If pixmap object 510 is not being used for any further operations then it may be destroyed, in step 760. Otherwise, the pixmap may remain deactivated (in secondary storage 173) until it is activated. Accordingly, the process iterates through steps 720-750, until utilization of pixmap object 510 has finished. Pixmap object 510 may then be destroyed in step 760. Destruction of pixmap object 510 permits blocks 410 and/or super-blocks 420 associated with pixmap object 510 to be returned to the memory pool. In some embodiments, deactivation step 740 may be performed in conjunction with the destruction of pixmap object 510, in step 760.

Other implementations will be apparent to those skilled in the art from consideration of the specification and practice of disclosed embodiments. It is intended that the specification and examples be considered as exemplary only, with its true scope and spirit being indicated by the following claims.

What is claimed is:

1. A method for managing at least one pixmap corresponding to an image using equal sized blocks allocated to the pixmap from a single memory pool, the method comprising:
providing a memory manager that manages the single memory pool on a block-by-block basis and provides a plurality of computer programs that access a buffer memory and a display list memory in the single memory pool with a standard interface through a memory management application programming interface (API), wherein the single memory pool is an allocated area of a physical memory configured to be managed as a common resource for the buffer memory and the display list memory with all blocks of the single memory pool configured to be allocated to and de-allocated from the frame buffer memory and the display list memory at any time during the management of the pixmap;
the memory manager receiving, from any of the plurality of programs through the memory management API, a request for at least one scanline in the image;
the memory manager securing a pointer to at least one block from the single memory pool in response to the request for the at least one scanline, if memory blocks are available in the single memory pool; and
the memory manager applying at least one of a plurality of memory freeing strategies to at least one block of the buffer memory or the display list memory, if there are no memory blocks available in the single memory pool, wherein the memory freeing strategies are applied to blocks that do not contain the scanline.

2. The method of claim 1, wherein securing a pointer to the at least one block from the memory pool in response to the request for the at least one scanline further comprises:
adding the pointer to a list of pointers secured by the pixmap;
associating the at least one scanline with the allocated block;
and storing the scanline in the block.

3. The method of claim 2, wherein the list of pointers is implemented as a linked list or static array.

4. The method of claim 3, wherein the linked list comprises at least one data field associated with each block in the linked list, where the at least one data field holds a pointer to the immediately succeeding block.

5. The method of claim 1, wherein the plurality of memory recovery strategies comprise of at least one of:
   waiting for allocated memory resident block objects to be freed;
   defragmenting the memory pool; and
   storing memory resident blocks associated with a pixmap in secondary storage.

6. The method of claim 2, wherein the blocks in the list of pixmap blocks occupy discontiguous memory locations.

7. The method of claim 1, wherein the single memory pool is resident on a printing device.

8. The method of claim 1, wherein an interleaved scanline organization is used as a packing format for the pixmap.

9. The method of claim 1, wherein an interleaved component plane organization is used as a packing format for the pixmap.

10. A non-transitory computer-readable medium that stores instructions, which when executed by a processor perform a method for managing at least one pixmap corresponding to an image using equal sized blocks allocated to the pixmap from a single memory pool, the method comprising:
   receiving by a memory manager a request for at least one scanline in the image, wherein the memory manager manages the single memory pool on a block-by-block basis and provides a plurality of computer programs that access a buffer memory and a display list memory in the single memory pool with a standard interface through a memory management application programming interface (API), wherein the single memory pool is an allocated area of physical memory configured to be managed as a common resource for the buffer memory and the display list memory, where all blocks of the single memory pool are configured to be allocated to and de-allocated from the frame buffer memory and the display list memory at any time during the management of the pixmap;
   the memory manager securing a pointer to at least one block from the single memory pool in response to the request for the at least one scanline, if memory blocks are available in the single memory pool; and
   the memory manager applying at least one of a plurality of memory freeing strategies to at least one block of the buffer memory or the display list memory, if there are no memory blocks available in the single memory pool, wherein the memory freeing strategies are applied to blocks that do not contain the scanline.

11. The computer-readable medium of claim 10, wherein securing a pointer to the at least one block from the memory pool in response to the request for the at least one scanline further comprises:
   adding the block to a list of blocks allocated to the pixmap;
   associating the at least one scanline with the allocated block;
   and storing the scanline in the block.

12. The computer-readable medium of claim 11, wherein the list of blocks is implemented as a linked list or static array.

13. The computer-readable medium of claim 12, wherein the linked list comprises at least one data field associated with each block in the linked list, where the at least one data field holds a pointer to the immediately succeeding block.

14. The computer-readable medium of claim 11, wherein the blocks in the list of pixmap blocks occupy discontiguous memory locations.

15. The computer-readable medium of claim 10, wherein the single memory pool is resident on a printing device.

16. The computer-readable medium of claim 10, wherein an interleaved scanline organization is used as the packing format for the pixmap.

17. The computer-readable medium of claim 10, wherein an interleaved component plane organization is used as the packing format for the pixmap.

18. A computer-readable memory that stores instructions, which when executed by a processor perform a method for managing at least one pixmap corresponding to an image using equal sized blocks allocated to the pixmap from a single memory pool, the method comprising:
   receiving by a memory manager a request for at least one scanline in the image, wherein the memory manager manages the single memory pool on a block-by-block basis and provides a plurality of computer programs that access a buffer memory and a display list memory in the single memory pool with a standard interface through a memory management application programming interface (API), wherein the single memory pool is an allocated area of a physical memory configured to be managed as a common resource for the buffer memory and the display list memory, where all blocks of the single memory pool are configured to be allocated to and de-allocated from the frame buffer memory and the display list memory at any time during the management of the pixmap;
   the memory manager securing a pointer to at least one block from the single memory pool in response to the request for the at least one scanline, if memory blocks are available in the single memory pool; and
   the memory manager applying at least one of a plurality of memory freeing strategies to at least one block of the buffer memory or the display list memory, if there are no memory blocks available in the single memory pool, wherein the memory freeing strategies are applied to blocks that do not contain the scanline.

19. The computer-readable memory of claim 18, wherein securing a pointer to the at least one block from the memory pool in response to the request for the at least one scanline further comprises:
   adding the block to a list of blocks allocated to the pixmap;
   associating the at least one scanline with the allocated block;
   and storing the scanline in the block.

20. The computer-readable memory of claim 19, wherein the list of blocks is implemented as a linked list or static array.

* * * * *